United States Patent Office 3,483,123
Patented Dec. 9, 1969

3,483,123
LUBRICATING COMPOSITIONS INCLUDING A POLYMER WHICH CONTAINS POLYMERIZED SULFINE
Donald C. Grimm, Cuyahoga Falls, Ohio, and Leonard Pierce, Jr., St. Albans, W. Va., assignors to Union Carbide Corporation, a corporation of New York
No Drawing. Filed Sept. 11, 1967, Ser. No. 666,944
Int. Cl. C10m 1/38; C08f 13/06
U.S. Cl. 252—48.6     3 Claims

ABSTRACT OF THE DISCLOSURE

There is disclosed lubricating compositions containing a polymeric additive as a viscosity index improver and a dispersant. The additive is a copolymer of an oil-solubilizing alkyl acrylate or methacrylate and a sulfine. The sulfine is prepared by adding dimethyl or diethyl sulfate to a methylthioalkyl acrylate or methacrylate.

---

The invention relates to lubricating composition that contain a polymeric additive as a viscosity index improver and dispersant. In a particular aspect, the invention relates to hydrocarbon lubricating oils that contain as additives copolymers of an oil-solubilizing monomer and a sulfine.

Internal combustion engine lubricants are being called upon to perform at high levels of efficiency over increasingly long periods of time. Polymeric and other additives are employed in such lubricants to improve the viscosity index, to increase the detergency and the dispersant properties of the oil, to increase the load-bearing properties of the oil, and the like. This invention is concerned with a polymeric additive that serves the dual purpose of being a viscosity index improver and a dispersant.

The polymeric additives of the invention are copolymers (i.e., polymers of two or more monomers) of an oil solubilizing monomer and a monomer imparting dispersant properties to the oil.

The oil-solubilizing monomer is normally a long chain (e.g., $C_8$–$C_{20}$) alkyl acrylate or methacrylate. Specific illustrative examples include octyl acrylate, nonyl methacrylate, isodecyl acrylate, decyl methacrylate, undecyl acrylate, lauryl acrylate, tridecyl methacrylate, myristyl acrylate, palmityl acrylate, stearyl acrylate, stearyl methacrylate, eicosyl acrylate, and the like. It may be desirable to employ a mixture of two or more oil-solubilizing monomers. For instance, it is desirable in some cases to employ an alkyl acrylate or methacrylate wherein the alkyl has at least 16 carbon atoms in combination with a shorter chain alkyl (e.g., $C_{10}$–$C_{12}$) acrylate or methacrylate. The longer chain alkyl groups help to increase the dispersant capacity of the polymer in order to help to prevent the polymer from losing oil-solubility by association with the partially oxidized products of combustion that constitute the major proportion of engine sludge. It is thus desirable that at least 15 weight percent, preferably at least 20 weight percent, and more preferably at least 30 weight percent of the oil-solubilizing monomer be an alkyl acrylate or methacrylate wherein the alkyl has 16 or more carbon atoms. A mixture of stearyl acrylate and isodecyl acrylate is a preferred oil-solubilizing monomer mixture.

It may also be desirable to include a small amount of a short chain alkyl acrylate or methacrylate in the polymer in order to enhance the viscosity index improving properties of the polymer. Specific illustrative examples include methyl methacrylate, methyl acrylate, ethyl methacrylate, isopropyl acrylate, butyl acrylate, and the like. Methyl methacrylate is preferred. The short chain (e.g., $C_1$–$C_4$) alkyl acrylate or methacrylate is usually used in small amounts, for example, from about 3 to about 15 weight percent of the total polymer weight.

The copolymers of the invention contain a polymerized sulfine. The sulfines that are employed are preferably compounds that are represented by Formula I:

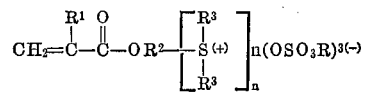

wherein $R^1$ represents hydrogen or methyl, wherein $R^2$ represents a saturated hydrocarbon group of from 1 to 4 carbon atoms and having a valence of $n+1$, wherein $R^3$ represents methyl or ethyl, and wherein $n$ represents 1 or 2. These sulfines can be produced by adding dimethyl sulfate to the corresponding methylthioalkyl acrylate or methacrylate, as disclosed in U.S. Patent No. 3,238,276. Examples of useful sulfines that can be employed are the following:

acryloxymethyldimethylsulfonium methylsulfate,
(2-acryloxyethyl) dimethylsulfonium methylsulfate,
(2-acryloxyethyl) methylethylsulfonium ethylsulfate,
(3-acryloxypropyl) dimethylsulfonium methylsulfate,
(4-acryloxybutyl) dimethylsulfonium methylsulfate,
(2-methacryloxyethyl) dimethylsulfonium methylsulfate,
3-acryloxypropyl-1,2-bis(dimethylsulfonium) di(methylsulfate),
3-methacryloxypropyl-1,2-bis(dimethylsulfonium) di(methylsulfate),
4-acryloxybutyl-1,2-bis(dimethylsulfonium) di(methylsulfate),
4-methacryloxybutyl-1,2-bis(dimethylsulfonium) di(methylsulfate), and the like. The preferred compound is (2-acryloxyethyl) dimethylsulfonium methyl sulfate.

The sulfine can also be formed by adding dimethyl sulfate or diethyl sulfate to a copolymer which contains polymerized methylthioalkyl acrylate or methacrylate in a manner analogous to that disclosed in U.S. Patent No. 3,238,276.

If desired, diethyl sulfate can be employed in lieu of or in addition to dimethyl sulfate in the preparation of the sulfine. However, dimethyl sulfate is preferred.

The sulfine compound is employed in the copolymer in an amount sufficient to enhance the detergent and viscosity index properties of the lubricating oils in which the copolymer is used as an additive. Usually, amounts of from about 1 to 20, and preferably from about 4 to 10 weight percent of sulfine is employed in the copolymer.

The copolymer of the invention can be produced by conventional polymerization techniques. For instance, the monomers can be mixed in the desired proportions along with a polymerization initiator. The polymerization reaction is then usually started by heating the reaction mixture to a temperature of at least the activation temperature of the initiator. The specific temperature employed will, of course, vary with the nature of the monomers and the initiator, but is usually within the range of from about 40° to about 110° C.

Polymerization initiators that can be employed include peroxides and azo compounds. Examples include t-butyl peroxypivalate, benzoyl peroxide, methyl ethyl ketone peroxide, t-butyl hydroperoxide, t-butyl perbenzoate, cumene hydroperoxide, azodiisobutyronitrile, dimethylazodiisobutyrate, isopropylperoxydicarbonate, and the like. Also useful are combinations of quaternary ammonium salts and peroxides. Examples of such salts include diisobutylphenoxyethoxyethyl - dimethylbenzyl ammonium chloride, lauryldimethylbenzyl ammonium chloride, and the like. The polymerization initiator is employed in conventional amounts, such as from about 0.05 to about 0.5 weight percent, based on weight of monomers.

It is usually convenient to carry out the polymerization in a solvent such as pentane, hexane, heptane, octane, xylene, toluene, benzene, naphtha, or the like. When a volatile solvent is employed it can be distilled at the conclusion of the polymerization after oil has been added to the copolymer solution. This procedure produces a concentrated solution of the copolymer in oil and is a very convenient way to recover the copolymer.

The molecular weight of the copolymer that is useful in the invention is usually expressed in terms of reduced viscosity ($I_r$). Reduced viscosity is defined by the equation:

$$I_r = \frac{T - T_o}{T_o(c)}$$

wherein T is the time required for a low concentrate copolymer solution to pass through a standard Ubbelohde viscometer, $T_o$ is the time for the pure solvent to pass through the viscometer, and $c$ is the concentration of the copolymer in grams of copolymer per 100 milliliters of solvent. Unless otherwise specified, the reduced viscosities of the copolymers discussed herein were determined in a solution of 0.1 gram of copolymer in 100 milliliters of benzene at 20° C.

It has been found that the copolymers that are useful in the invention generally have reduced viscosities in the range of from about 0.1 to about 2, and preferably from about 1 to 1.6.

The copolymers of the invention are employed as additives in oils in an amount sufficient to enhance the viscosity index and dispersant characteristics of the oil. Normally, amounts of from about 0.5 to about 3.0 weight percent of copolymer are employed (percentages being based upon weight of oil). The oils employed are the hydrocarbon oils of lubricating viscosity, whether of natural origin or synthetic. Preferred oils are substantially paraffinic and/or naphthenic, although some aromatic hydrocarbons can be present in the oil. The nature and production of such oils are well known.

It is within the scope of the invention to employ other types of additives in the lubricating compositions of the invention. Antioxidants, extreme pressure agents, pour point depressants, and the like are examples of known types of additives.

The lubricating compositions of the invention are useful in automobile crankcases and as lubricants in other internal combustion engines.

The examples below illustrate the invention.

EXAMPLE 1

To a one pint Pyrex pressure bottle was added the following: 48.0 grams of isodecyl methacrylate, 0.95 gram of dimethylsulfate, 1.05 grams of methylthioethyl acrylate, 50 grams of heptane, and 0.05 gram of azoisobutyronitrile. After flushing with nitrogen, the bottle was capped and rotated end-over-end in a 55° C. constant temperature bath until 100 percent conversion of these monomers to polymer was obtained. Three grams of this polymer were dissolved in 97 grams of a 200 SUS oil. A mixture of 29 grams of this blend and 12 grams of Standardized Oil Filter Test Contaminant No. 1 was then centrifuged at 1500 r.p.m. and 20° C. for 5 hours. This test is subsequently referred to as the centrifugal sludge dispersancy test. A sediment level of 3.8 ml. was obtained whereas a level of 4.3 ml. was obtained when using a polymeric additive that was a VI improver but not a dispersant.

EXAMPLE 2

A copolymer of 9 percent (2-acryloxyethyl)dimethylsulfonium methyl sulfate and 91 percent of isodecyl acrylate was prepared in a one liter kettle at 60° C. with azoisobutyronitrile initiator, and heptane solvent. The reduced viscosity (0.1 gram polymer and 100 ml. benzene at 20° C.) was 0.583. In the centrifugal sludge dispersancy test a level of 3.6 ml. of sediment was obtained. This copolymer was then evaluated further in a modified Sequence 5 engine test. The modification consists of partially rating the engine during the 8-hour down period following each 16-hour operating cycle rather than rating the engine only after 192 hours of operation. The test is terminated when the sludge ratings decrease sharply. No detergents are used in the oil. A blend of 1.17 percent of the above copolymer and 1.0 percent of Amoco 193 inhibitor was improved in dispersancy performance over blend of copolymers of methylthioethyl acrylate and isodecyl acrylate. Also, the blend of this example had a 210° F. viscosity of 8.82 cs. and a viscosity index of 123 whereas a blend containing no polymer had a 210° F. viscosity of 6.19 cs. and a viscosity index of 94. Thus, the copolymer of this invention is an effective viscosity index improver-dispersant. The performance of the copolymer of this example in the modified Sequence 5 engine test is shown below in Table I.

EXAMPLE 3

The following were charged into a kettle: 16.7 g. dimethyl sulfate, 19.3 g. methylthioethyl acrylate, 414 g. isodecyl acrylate, and 277.5 g. heptane. The kettle contents were stirred continuously, purged with $N_2$, and heated to 45° C. at a pressure sufficiently low to reflux the heptane and maintain the temperature at 45° C. 22.5 G. of a 2 percent solution of Lupersol-11 (t-butyl peroxypivalate) in heptane was slowly added to the boiling contents of the reactor. After the monomers had polymerized for 24 hours, 13 g. of the initiator solution was added to the kettle. After another 24 hours the solution was cooled to 25° C. Analysis of a small sample weighed before and after being heated at 150° C. and 1 mm. Hg pressure in a vacuum dessicator showed that the monomers were converted 100 percent to polymer. The reduced viscosity of the copolymer was 0.82. The copolymer was then solvent exchanged into a 200 SUS oil at a temperature of 100° C. and a pressure of 1 mm. Hg at a concentration of 14.3 percent. A blend of 3 percent of this copolymer in the same oil as used in previous examples had a 3.5 ml. sediment level in the centrifugal sludge dispersancy test. Furthermore, a blend of this copolymer at 1.17 percent and of Amoco 193 inhibitor at 1.0 percent in a 200 SUS oil performed, as shown below in Table I, in an excellent manner in the modified Sequence 5 engine test. Also, the viscosity index improving properties are demonstrated by the 9.18 cs. viscosity at 210° F. and the 126.5 viscosity index obtained with this blend.

EXAMPLE 4

A stirred kettle containing 92.0 g. isodecyl acrylate and 44.9 g. hexane was heated to 83° C. and purged with $N_2$. A solution of 4.6 g. of 1 percent lauroyl peroxide was added to initiate polymerization. After 3 hours a small sample of the solution was removed from the kettle, cooled to 25° C., and analyzed for polymer content. The weight difference before and after heating at 150° C. and 1 mm. Hg showed that 92.3 percent of the monomers had polymerized. Immediately after sampling, 4.0 g. methylthioethyl acrylate and 4.0 g. acrylonitrile were added to the mixture of monomer and polymer and the polymerization was continued for another 4 hours. One hundred percent conversion of monomer to polymer was obtained. In the centrifugal sludge dispersancy test, a level of 3.4 ml. for a 3 percent blend of this copolymer in a 200 SUS oil was obtained.

A solution of 36.0 g. of this copolymer, 94 g. heptane, and 1.397 g. of dimethyl sulfate was then prepared and weighed into a pint pressure bottle. After reacting at 70° C. for 3 days, the bottle was cooled and a three percent blend of the modified copolymer in a 200 SUS oil was evaluated in the centrifugal sludge dispersancy test. A level of 2.5 ml. was obtained. This level is a definite improvement over that obtained with the copolymer before the methylthioethyl acrylate was reacted with dimethyl sulfate.

EXAMPLE 5

Into a 30 ml. capacity pressure tube was weighed the following: 9.1 g. isodecyl methacrylate, 9.6 g. heptane, 0.4 g. of a 4 percent solution of azoisobutyronitrile in benzene, and 0.9 g. of the stoichiometric reaction product of diethyl sulfate and methylthioethyl acrylate, i.e., (2-acryloxyethyl)methylethylsulfonium ethylsulfate. After 86.2 percent of these monomers had polymerized, a blend of 3 grams of this copolymer and 97 grams of a 200 SUS oil was evaluated in the centrifugal sludge dispersance test. The level of 3.5 ml. which was obtained demonstrates the dispersancy properties of this copolymer.

EXAMPLE 6

A stirred kettle containing 92 g. isodecyl methacrylate, 5 g. of methylthioethyl acrylate, and 75.65 g. heptane was heated to 80° C. under a vacuum of 306 mm. Hg and purged with $N_2$. After the mixture had stirred under these conditions for several minutes, 3.65 g. of a 4 percent solution of azoisobutyronitrile was added. Within fifteen minutes polymer in the kettle was noticeable. After polymerizing for another 5.5 hours the solution was sampled and analyzed for its polymer content. 94.7 percent of the monomers were converted to polymer. Into a small beaker was weighed 2.76 g. of dimethyl sulfate and 3.22 g. of methylthioethyl acrylate. In about 18 minutes the temperature of this mixture had risen to 40° C. At this time the 2-acryloxyethyldimethyl sulfonium methyl sulfate was added to the kettle. The beaker was rinsed several times with benzene to ensure transfer of all 6 g. of the monomer. After the solution had polymerized at 74.0° C. to 80° C. for another 18 hours the reactor was cooled. 99 percent of the monomers were converted to polymer. In the centrifugal sludge dispersancy test, a 3.4 ml. sediment level was obtained.

Table I, below, displays the results obtained in the modified Sequence 5 engine test for Examples 2 and 3 and for a copolymer of methylthioethyl acrylate and two commercial products. The commercial products are copolymers of long chain alkyl acrylate and N-vinyl pyrrolidone, and are widely used in industry as VI improver-dispersants.

TABLE I.—MODIFIED SEQUENCE 5 ENGINE TEST RESULTS

| Polymer | 16 Hours | | | 32 Hours | | | 48 Hours | | |
|---|---|---|---|---|---|---|---|---|---|
| | RAA | RACP | VD | RAA | RACP | VD | RAA | RACP | VD |
| Example 2 | 9.9 | 9.9 | 9.9 | 9.8 | 9.8 | 9.8 | 8.5 | 8.6 | 8.8 |
| Commercial Product A | 9.9 | 9.9 | 9.9 | 9.9 | 9.9 | 9.9 | 9.2 | 9.0 | 9.0 |
| Example 3 | 9.9 | 9.9 | 9.9 | 9.9 | 9.9 | 9.9 | 9.8 | 9.8 | 9.7 |
| MTEA 9%/DA | 9.8 | 9.9 | 9.8 | 9.0 | 8.7 | 9.0 | 7.6 | 7.0 | 7.5 |
| MTEA 9%/DA | 10.0 | 9.8 | 9.8 | 8.0 | 9.0 | 8.0 | 7.5 | 7.4 | 6.5 |
| Commercial Product B | 10.0 | 10.0 | 10.0 | 9.3 | 8.9 | 9.2 | 6.1 | 5.0 | 5.6 |

RAA=Rocker Arm assembly.
RACP=Rocker arm cover plate.
VD=Valve deck.
MTEA=Methylthioethyl acrylate.
DA=Isodecyl acrylate.

What is claimed is:

1. A lubricating composition comprising a major amount of a hydrocarbon oil of lubricating viscosity, and a minor amount, sufficient to enhance the detergent characteristics of said oil, of a copolymer of (a) an oil-solubilizing proportion of a long chain alkyl acrylate or methacrylate, and (b) a composition of the formula

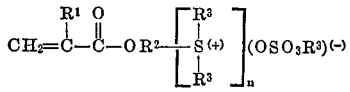

wherein $R^1$ represents hydrogen or methyl, wherein $R^2$ represents a saturated hydrocarbon group of from 1 to 4 carbon atoms and having a valence of $n+1$, wherein $R^3$ represents methyl or ethyl, and wherein $n$ represents 1 or 2 said copolymer having a reduced viscosity in a solution of 0.1 gram of copolymer in 100 ml. of benzene at 20° C. of between about 0.1 and 2.0.

2. The lubricating composition of claim 1 wherein the composition defined in sub-paragraph (b) is an (acryloxyalkyl)-dimethylsulfonium methylsulfate.

3. The lubricating composition of claim 1 wherein the composition defined in sub-paragraph (b) is (2-acryloxyethyl)-dimethylsulfonium methylsulfate.

References Cited

UNITED STATES PATENTS

| 2,882,157 | 4/1959 | Thompson et al. | 252—34 X |
| 2,892,788 | 6/1959 | Stewart et al. | 252—34 X |
| 2,935,474 | 5/1960 | Kirkpatrick et al. | 252—34 X |
| 3,208,945 | 9/1965 | Stuart et al. | 252—34 X |
| 3,226,373 | 12/1965 | Fareri et al. | 252—34 X |
| 3,231,587 | 1/1966 | Reuse et al. | 252—34 X |

DANIEL E. WYMAN, Primary Examiner

W. CANNON, Assistant Examiner

U.S. Cl. X.R.
260—79, 79.3